(12) United States Patent
Kim (10) Patent No.: US 10,196,084 B2
(45) Date of Patent: Feb. 5, 2019

(54) RACK ASSIST TYPE ELECTRIC POWER STEERING APPARATUS

(71) Applicant: MANDO CORPORATION, Gyeonggi-do (KR)

(72) Inventor: Dong Wan Kim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/635,196

(22) Filed: Jun. 28, 2017

(65) Prior Publication Data
US 2018/0009464 A1 Jan. 11, 2018

(30) Foreign Application Priority Data

Jul. 5, 2016 (KR) .................. 10-2016-0084637

(51) Int. Cl.
| | | |
|---|---|---|
| *B62D 5/04* | (2006.01) | |
| *F16H 25/22* | (2006.01) | |
| *F16H 35/18* | (2006.01) | |
| *F16C 19/06* | (2006.01) | |
| *F16H 25/20* | (2006.01) | |

(52) U.S. Cl.
CPC ......... *B62D 5/0448* (2013.01); *B62D 5/0424* (2013.01); *F16H 25/2204* (2013.01); *F16H 35/18* (2013.01); *F16C 19/06* (2013.01); *F16H 2025/204* (2013.01)

(58) Field of Classification Search
CPC ... B62D 5/0448; B62D 5/0445; B62D 5/0442
See application file for complete search history.

(56) References Cited

U.S. PATENT DOCUMENTS

| 4,593,781 A * | 6/1986 | Galtier ................. | B62D 5/0448 180/444 |
|---|---|---|---|
| 9,975,574 B2 * | 5/2018 | Ohashi .................. | B62D 7/228 |
| 2002/0108803 A1 * | 8/2002 | Toyofuku ............. | B62D 5/0427 180/443 |
| 2004/0245041 A1 * | 12/2004 | Fukuda ................ | B62D 5/0427 180/444 |

(Continued)

FOREIGN PATENT DOCUMENTS

| JP | 9-229036 | 9/1997 |
|---|---|---|
| JP | 2015-54609 | 3/2015 |
| KR | 10-2014-0082303 | 7/2014 |

OTHER PUBLICATIONS

Office Action dated Sep. 1, 2017 for Korean Patent Application No. 10-2016-0084637 and its English machine translation by Google Translate.

*Primary Examiner* — William Kelleher
*Assistant Examiner* — Gregory T Prather
(74) *Attorney, Agent, or Firm* — Ladas & Parry, LLP (57) ABSTRACT

The present invention provides a rack assist type electric power steering apparatus. The power steering apparatus includes: a ball nut coupled to a rack bar via balls to be rotated, and configured to cause the rack bar to slide; a bearing mounted on an outer peripheral surface of the ball nut so as to support rotation of the ball nut; and a support member coupled to at least one of a space between one side of an outer race of the bearing and a housing and a space between the other side of the outer race of the bearing and the housing so as to support the bearing.

20 Claims, 9 Drawing Sheets

(56) References Cited

U.S. PATENT DOCUMENTS

| | | | |
|---|---|---|---|
| 2009/0294203 A1* | 12/2009 | Okada | B62D 5/0448 180/444 |
| 2011/0048838 A1* | 3/2011 | Asakura | B62D 5/0427 180/444 |
| 2011/0127742 A1* | 6/2011 | Bae | B62D 5/0448 280/93.513 |
| 2012/0298439 A1* | 11/2012 | Ji | B62D 5/0403 180/443 |
| 2013/0220728 A1* | 8/2013 | Lee | B62D 5/0448 180/444 |
| 2014/0027196 A1* | 1/2014 | Kaneko | B62D 5/0448 180/444 |
| 2014/0260728 A1* | 9/2014 | Holm | B62D 5/0448 74/89.23 |
| 2014/0353068 A1* | 12/2014 | Yamamoto | B62D 5/0412 180/444 |
| 2015/0217800 A1* | 8/2015 | Laszlo | B62D 5/0424 474/113 |
| 2015/0239493 A1* | 8/2015 | Ito | B62D 3/08 180/444 |
| 2015/0274200 A1* | 10/2015 | Nakamura | B62D 5/0448 180/444 |
| 2016/0083006 A1* | 3/2016 | Kimpian | F16O 25/083 180/444 |
| 2017/0096165 A1* | 4/2017 | Bae | B62D 5/0424 |
| 2018/0009464 A1* | 1/2018 | Kim | B62D 5/0424 |

\* cited by examiner

RACK ASSIST TYPE ELECTRIC POWER STEERING APPARATUS

CROSS REFERENCE TO RELATED APPLICATION

This application claims priority from Korean Patent Application No. 10-2016-0084637, filed on Jul. 5, 2016, which is hereby incorporated by reference for all purposes as if fully set forth herein.

BACKGROUND OF THE INVENTION

1. Field of the Invention

The present invention relates to a rack assist type electric power steering apparatus, and more particularly, to a rack assist type electric power steering apparatus, in which when a rack bar slides while a ball nut is rotated, a bearing can be prevented from being rotated or released by axial and radial vibration, which is generated through the rack bar, the ball nut, a rack housing, and the like, and vibration and noise transmitted through the ball nut and the rack bar can be reduced, so that a comfortable steering feeling can be provided to the driver.

2. Description of the Prior Art

A hydraulic power steering apparatus using a hydraulic pressure of a hydraulic pump is generally used as a vehicular power assist steering apparatus of an automobile. Recently, an electric power steering apparatus using a motor has been gradually popularized.

A general electric steering apparatus includes a steering system extending from a steering wheel to opposite side wheels and an auxiliary power mechanism that supplies auxiliary steering power to the steering system.

The auxiliary power mechanism includes: a torque sensor configured to sense a steering torque that is applied to the steering wheel by the driver and to output an electric signal that is proportional to the sensed steering torque; an Electronic Control Unit (ECU) configured to generate a control signal based on the electric signal sent from the torque sensor; a motor configured to generate auxiliary steering power based on the control signal sent from the electronic control unit; and a belt-type transmission configured to transmit the auxiliary steering power generated from the motor to the rack bar via a belt.

Figure 1:
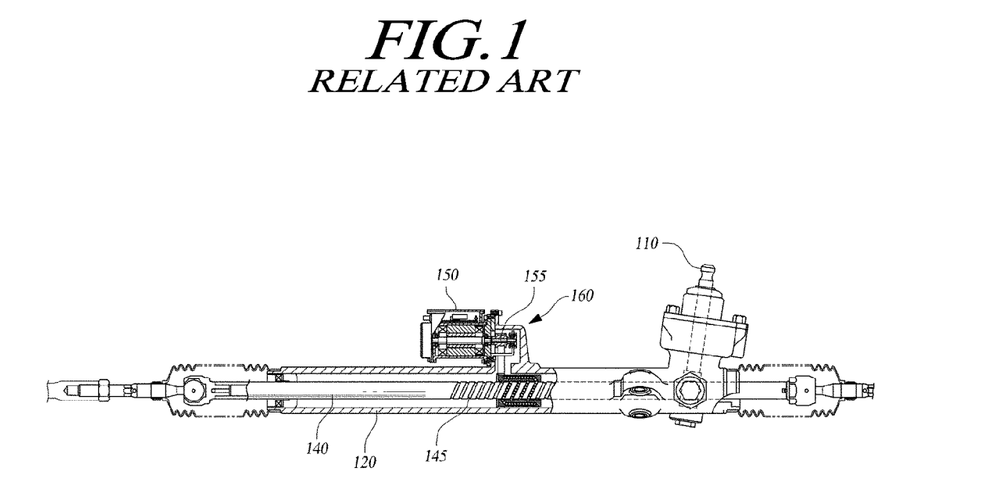
FIG. 1 is a partial cross-sectional view schematically illustrating a conventional rack assist type electric power steering apparatus.
Figure 2:
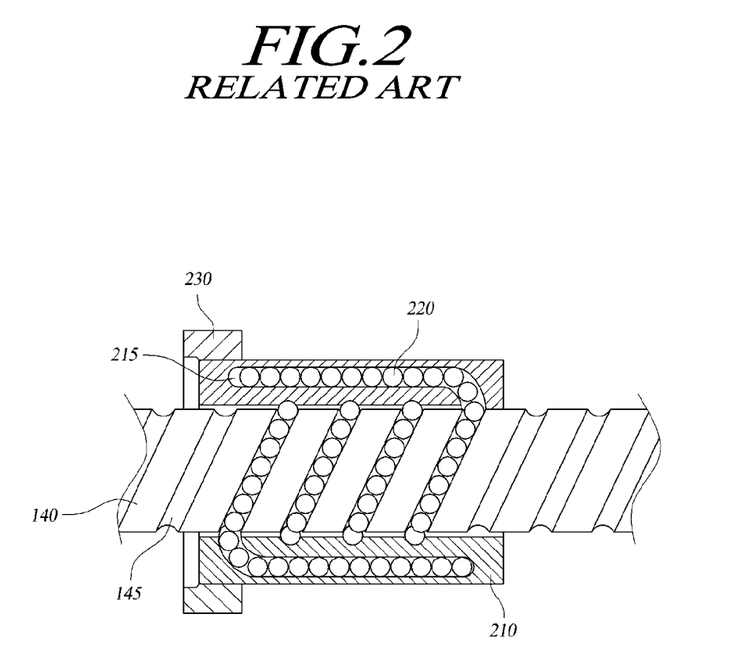
FIG. 2 is a cross-sectional view schematically showing a portion of the conventional rack assist type electric power steering apparatus.

FIG. 1 is a partial cross-sectional view schematically illustrating a conventional rack assist type electric power steering apparatus, and FIG. 2 is a cross-sectional view schematically illustrating a portion of the conventional rack assist type electric power steering apparatus.

As illustrated in FIGS. 1 and 2, a conventional rack assist type electric power steering apparatus includes: a rack bar 140 extending in the lateral direction of a vehicle and including a rack gear on one side of an outer peripheral surface thereof; a pinion shaft 110 having a pinion gear engaged with the rack gear; a ball nut 210 engaged with the outer peripheral screw groove 145 via balls 220; a belt-type power transmission device 160 configured to interconnect the ball nut 210 and a motor shaft 155; and a motor 150.

The pinion shaft 110 is connected to the steering wheel through the steering shaft, and the rack bar 140, which has the outer peripheral screw groove 145 of a predetermined length formed on one side of the outer peripheral surface, is embedded in the rack housing 120.

The belt-type power transmission device 160 is formed to include a belt configured to interconnect the motor shaft 155 and the ball nut 210, and is configured to transmit auxiliary steering power generated by the motor 150 in an amount proportional to the steering torque applied to the steering wheel to the rack bar 140 through the ball nut 210.

As illustrated in FIG. 2, the conventional rack assist type electric power steering apparatus includes: a rack bar 140 having an outer peripheral screw groove 145 on an outer peripheral surface thereof; a ball nut 210 including an intermediate path 215 through which balls 220 are circulated; the balls 220 configured to move in a rolling fashion while being in contact with the outer peripheral screw groove 145 and the intermediate path 215 in the rack bar; and an end cap 230 attached to an end of the ball nut 210.

The rack assist type electric power steering apparatus is configured such that the balls 220 move in a rolling fashion while being in contact with the outer peripheral screw groove 145 of the rack bar 140 and the inner peripheral screw groove in the ball nut 210, thereby causing the rack bar 140 to slide.

However, according to this conventional technique, there are problems in that when the ball nut causes the rack bar to slide while rotating, noise and vibration are generated through the rack bar, the ball nut, the bearing, the rack housing, and the like, and in that the noise and vibration are transmitted to the other components, thereby causing the other components to be loosened.

In addition, there is a problem in that the noise and vibration transmitted in this way are transmitted to a driver together with the vibration and noise of the other components, thereby deteriorating the steering feeling of the driver.

SUMMARY OF THE INVENTION

Thus, the present invention has been made under the above-described background, and an object of the present invention is to provide a rack assist type electric power steering apparatus, in which when a rack bar slides while a ball nut is rotated, a bearing can be prevented from being rotated or released by axial and radial vibration, which is generated through the rack bar, the ball nut, a rack housing, and the like, and vibration and noise transmitted through the ball nut and the rack bar can be reduced, so that a comfortable steering feeling can be provided to the driver.

The object of the present invention is not limited to those described above, and other objects, which are not described above, may be clearly understood by a person ordinarily skilled in the art from the following description.

In order to achieve the objects, the present invention provides a rack assist type electric power steering apparatus that includes: a ball nut coupled to a rack bar via balls to be rotated, and configured to cause the rack bar to slide; a bearing mounted on an outer peripheral surface of the ball nut so as to support rotation of the ball nut; and a support member coupled to at least one of a space between one side of an outer race of the bearing and a housing and a space between the other side of the outer race and the housing so as to support the bearing.

According to the present invention, when a rack bar slides while a ball nut is rotated, a bearing can be prevented from being rotated or released by axial and radial vibration, which is generated through the rack bar, the ball nut, a rack housing, and the like, and vibration and noise transmitted through the ball nut and the rack bar can be reduced, so that a comfortable steering feeling can be provided to the driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
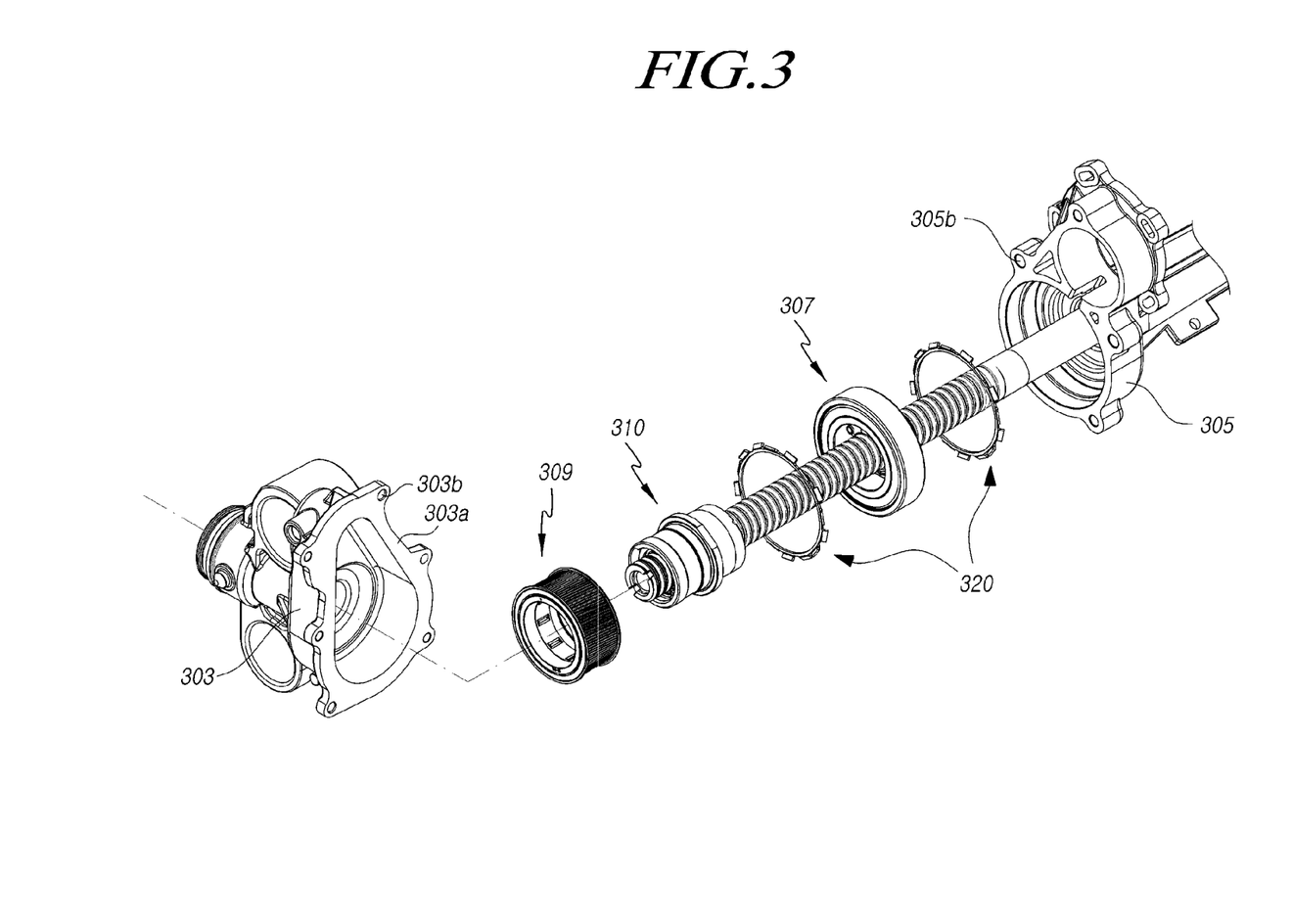
FIG. 3 is an exploded perspective view illustrating a portion of a rack assist type electric power steering apparatus according to an embodiment of the present invention.
Figure 4:
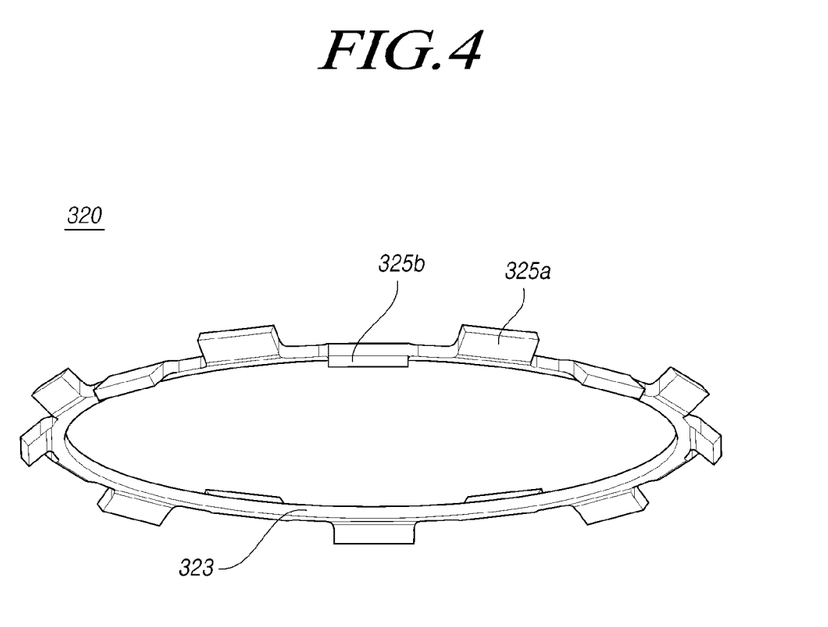
FIG. 4 is a perspective view illustrating a support member of the rack assist type electric power steering apparatus according to the embodiment of the present invention.
Figure 5:
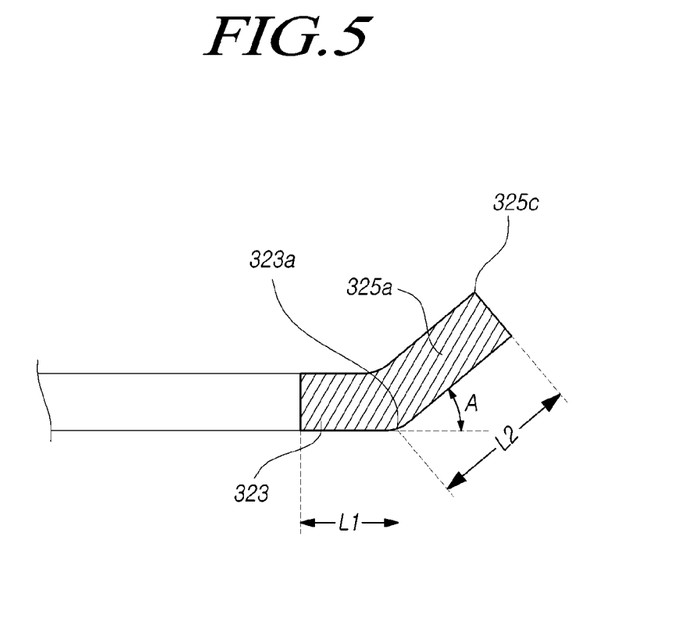
FIGS. 5 and 6 are cross-sectional views each illustrating a portion of FIG. 4.
Figure 6:
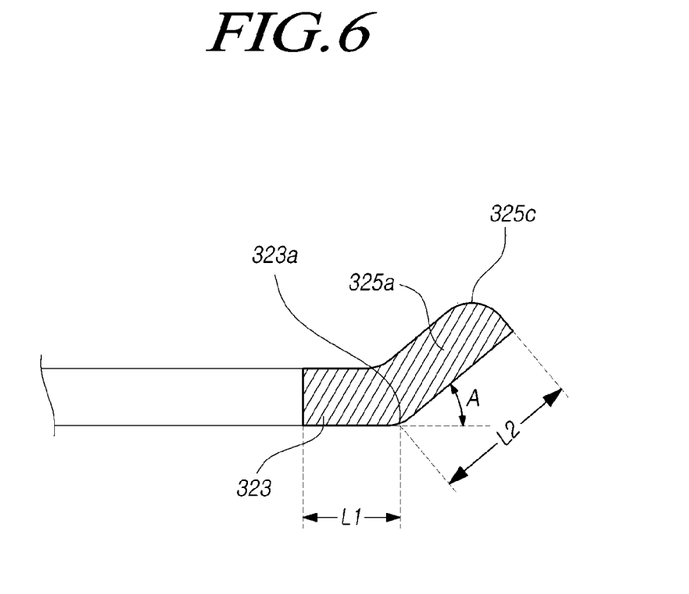
Figure 7:
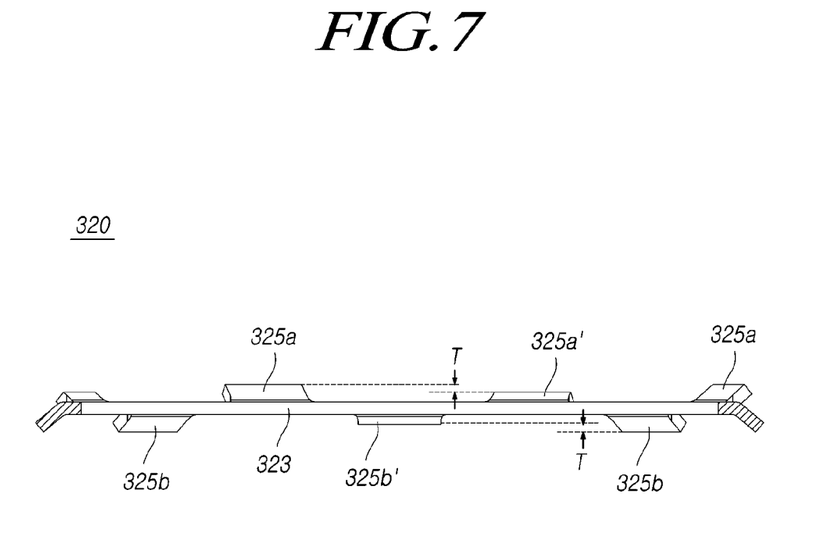
FIG. 7 is a side view illustrating the support member of FIG. 4.
Figure 8:
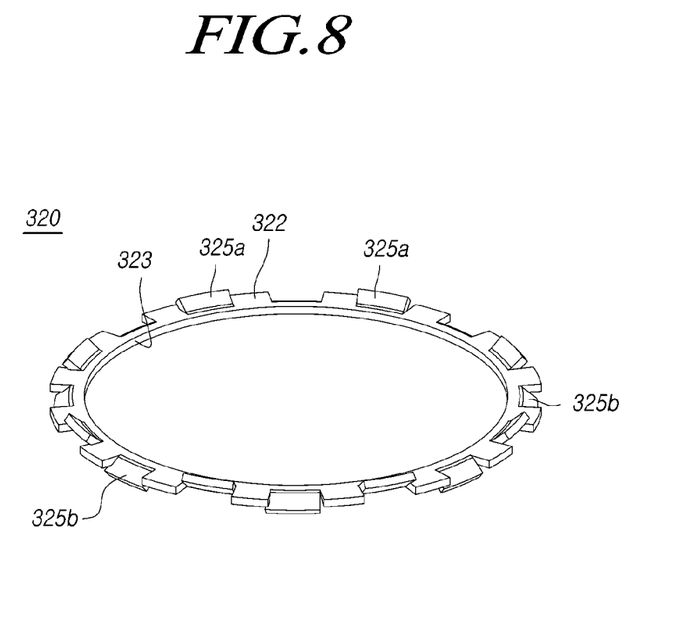
FIG. 8 is a perspective view illustrating a support member of a rack assist type electric power steering apparatus according to an embodiment of the present invention.
Figure 9:
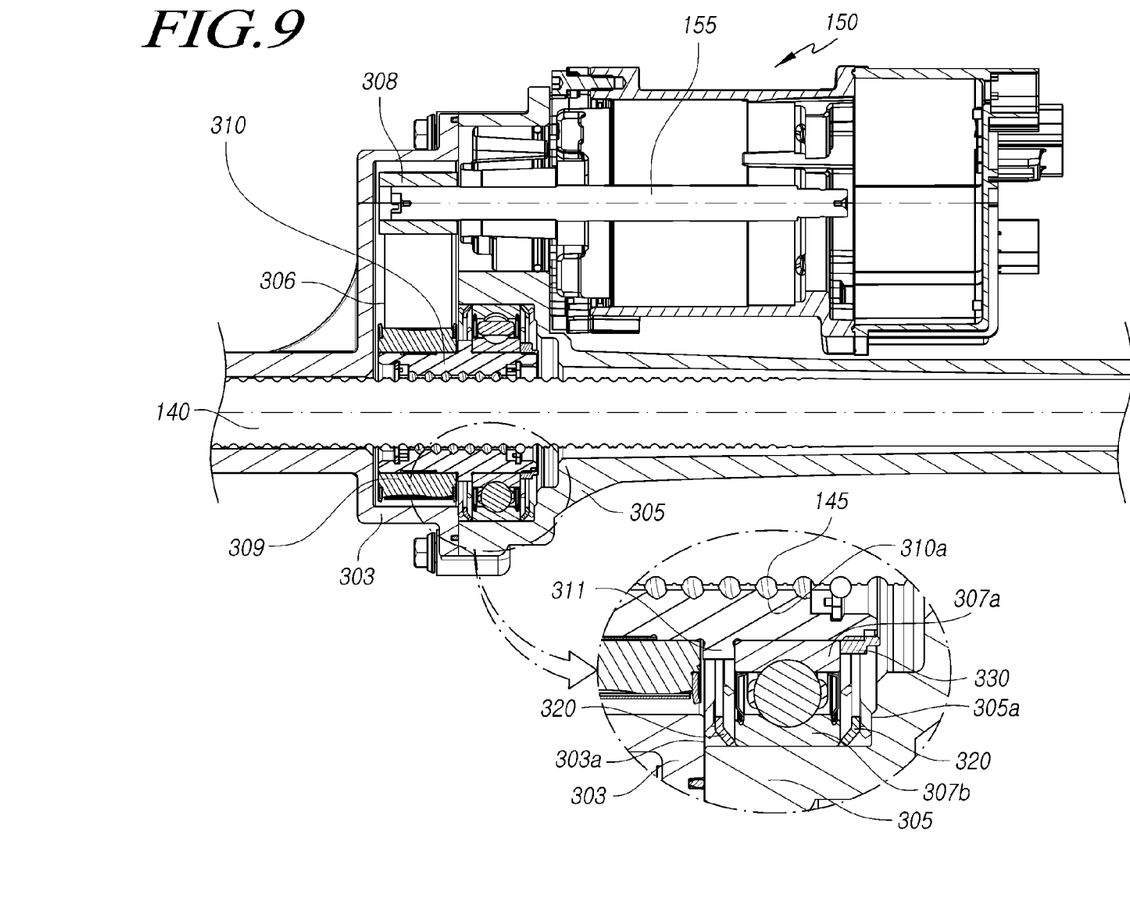
FIG. 9 is a cross-sectional view illustrating a portion of a rack assist type electric power steering apparatus according to an embodiment of the present invention.

FIG. 3 is an exploded perspective view illustrating a portion of a rack assist type electric power steering apparatus according to an embodiment of the present invention. FIG. 4 is a perspective view illustrating a support member of the rack assist type electric power steering apparatus according to the embodiment of the present invention. FIGS. 5 and 6 are cross-sectional views each illustrating a portion of FIG. 4. FIG. 7 is a side view illustrating the support member of FIG. 4. FIG. 8 is a perspective view illustrating a support member of a rack assist type electric power steering apparatus according to an embodiment of the present invention. FIG. 9 is a cross-sectional view illustrating a portion of a rack assist type electric power steering apparatus according to an embodiment of the present invention. As illustrated in the drawings, a rack assist type electric power steering apparatus according to the present invention includes: a ball nut 310 coupled to a rack bar 140 via balls to be rotated, and configured to cause the rack bar 140 to slide; a bearing 307 mounted on an outer peripheral surface of the ball nut 310 so as to support rotation of the ball nut 310; and a support member 320 coupled to at least one of a space between a side of an outer race 307b of the bearing 307 and a housing 305 and a space between the other side of the outer race 307b and a housing 303 so as to support the bearing 320.

The rack-driven power assist steering apparatus includes a driving unit and a driven unit. The driving unit includes an electric motor 150 controlled by an electronic control unit (ECU), a motor pulley 308 fixed to a shaft 155 of the electric motor 150, and a drive belt 306.

In addition, the driven unit includes a ball nut 310 configured to support the rack bar 140 within the rack housing 303 or 305 that encloses the rack bar 140, and a nut pulley 309 separately molded on or coupled to the outer peripheral surface of the ball nut 310.

The motor pulley 308 connected with the electric motor 150 and the nut pulley 309 connected with the rack bar 140 are disposed in parallel to each other, and the drive belt 306 is fitted to the motor pulley 308 and the nut pulley 309 so as to transmit the torque of the electric motor 150 to the rack bar 140 via the ball nut 310, and to move the rack bar 140 from side to side by the operation of the ball nut 310, thereby generating auxiliary steering power.

The ball nut 310 is coupled to the rack bar 140 via the balls and causes the rack bar 140 to slide inside the housings 303 and 305, and the ball nut 310 is mounted on the outer peripheral surface of the ball nut 310 so as to support the rotation of the bearing 307.

A power transmission structure is provided on the inner peripheral surface of the ball nut 310 and the outer peripheral surface of the rack bar 140 to generate auxiliary steering power by sliding the rack bar 140 in the axial direction. The power transmission structure includes an outer peripheral screw groove 145 formed in a spiral shape having a hemispherical cross section on the outer peripheral surface of the rack bar 140, balls (not illustrated) inserted into the outer peripheral screw groove 145, and an inner peripheral screw groove 310a formed in a spiral shape having a hemispherical cross section on the inner peripheral surface of the ball nut 310 to correspond to the outer peripheral screw groove 145.

The ball nut 310 is a hollow tube having an inner peripheral screw groove 310a formed on an inner peripheral surface thereof, and a nut pulley 309 is provided to be in close contact with one side of the outer peripheral surface of the ball nut 310. A bearing 307 is installed on the outer peripheral side of one end of the ball nut 310, and at the end of the inner race 307a of the bearing 307, a lock nut 330 is screw-coupled to the outer peripheral surface of the ball nut 310 and fixed, thereby supporting the inner race 307a of the bearing 307.

In addition, a support member 307 configured to support the bearing 307 is provided on at least one of the space between one side of the outer race 307b of the bearing 307 and the housing 305 and the space between the other side of the outer race 307b of the bearing 307 and the housing 303 so as to dampen vibration and noise transmitted through the bearing 307 while preventing the rotation of the outer race 307b of the bearing 307.

However, in the embodiment of the present invention, it is illustrated that support members 320 are coupled to both the space between the one side of the outer race 307b of the bearing 307 and the housing 305 and the space between the other side of the outer race 307b of the bearing 307 and the housing 303.

The support member 320 includes a main body 323 that is formed in an annular shape, and support projections 325a and 325b that protrude from the main body 323 in a radial direction and an inclined direction and are formed by bending.

The support projections 325a and 325b may be spaced apart from each other along the circumferential direction of the main body 323, in which at least one of several support projections 325a and 325b may be formed to be bent in the main body 323 in a direction opposite to the bent direction of the other support projections 325b, which are bent in a different direction.

Since the at least one support projection 325a is formed to be bent in a direction opposite to that of the other support projections 325b, the bearing 307 can be elastically supported in the opposite directions thereof, so that the bearings 307 can be supported stably.

In addition, the support projections 325a may be formed to be alternately arranged with the support projections 325b, which are bent in a direction opposite to the bent direction of the support projections 325a, in the circumferential direction. Since the support projections 325a and 325b, which are bent in the opposite directions, are arranged alternately, the bearing 307 may be elastically uniformly supported in the opposite directions thereof.

The support projections 325a and 325b is formed in such a manner that a length L2 from a bent portion 323a of the main body 323 to the end portion of each support projection is formed to be 1.3 to 1.7 times longer than a length L1 from the inner end of the main body 323 to the bent portion 323a. In order to prevent the elastic support force of the support projections 325a and 325b from becoming too large or too small, the support projections 325a and 325b may be formed to be 1.3 to 1.7 times longer than the radial length L1 from the inner end of the main body 323 to the bent portion 323a.

In other words, when the support projections 325a and 325b are formed to have a length that is less than 1.3 times the radial length from the inner end of the main body 323 to the bent portion 323a, the support force is strong, but the rigidity of the support projections 325a and 325b is too great, whereby the elastic deformation amount of the support projections 325a and 325b is reduced, and as a result, the vibration and impact absorption performance deteriorates. When the support projections 325a and 325b are formed to have a length that is greater than 1.7 times the radial length from the inner end of the main body 323 to the bent portion 323a, the support force is weakened, but the elastic deformation amount of the support projections 325a and 325b is too great, whereby rattling noise is increased.

Therefore, the extension length of the support projections 325a and 325b is set to be 1.3 to 1.7 times longer than the radial width of the main body 323 such that the support force and the elastic deformation amount may be optimized.

In addition, the angle of the support projections 325a and 325b with respect to the radial direction of the main body 323 is set to be in a range of 30 degrees to 50 degrees. The bending angle A of the support projections 325a and 325b (i.e., the angle between the support projections 325a and 325b and the radial direction of the main body 323 at the outer end of the main body 323) is set to be in a range of 30 degrees to 50 degrees in order to prevent the elastic support force of the support projections 325a and 325b from becoming too large or too small according to the bending angle of the support projections 325a and 325b, as described above.

That is, when the angle of the support projections 325a and 325b with respect to the radial direction of the main body 323 is formed to be smaller than 30 degrees, the support force is strong, but the rigidity of the support projections 325a and 325b is too great, whereby the elastic deformation amount of the support projections 325a and 325b is reduced, and as a result, the vibration and impact absorption performance deteriorates, and when the angle of the support projections 325a and 325b with respect to the radial direction of the main body 323 is formed to be larger than 50 degrees, the supporting force is weak, but the elastic deformation amount of the support projections 325a and 325b is too great, whereby rattling noise becomes large. Thus, the angle of the support projections 325a and 325b with respect to the radial direction of the main body 323 is set to be in the range of 30 degrees to 50 degrees.

In addition, as illustrated in FIG. 5, the support projections 325a and 325b are formed to have sharp end edges 325c, so that, at the time of coupling the support member 320, the end edges 325c of the support projections 325a and 325b are elastically deformed while being supported by the outer race 307b of the bearing 307 and the rack housing 303 or the gear housing 305.

Since the end edges 325c of the support projections 325a and 325b are formed to be sharp, when the support projections 325a and 325b are elastically deformed, the end edges 325c of the support projections 325a and 325b are pressed against the surfaces of the outer race 307b of the bearing 307 and the housings 303 and 305 and apply concentrated loads thereto, thereby facilitating the prevention of rotational movement.

As illustrated in FIG. 6, the support projections 325a and 325b may be formed to have a rounded end edge 325c. In the case where the end edges 325c are formed to be rounded, when an impact input from the outside is great in a certain kind of a vehicle and the support projections 325a and 325b are elastically deformed, the noise, which is generated while the end edges 325c move along the surfaces of the outer race 307b of the bearing 307 and the housings 303 and 305, can be easily prevented.

In addition, as illustrated in FIG. 7, the support member 320 is provided with stop projections 325a' and 325b' between the support projections 353a and 352b, which are bent in the same direction. The stop projections 325a' and 325b' are formed by bending to have a length that is smaller than the extension length of the support projections 325a and 325b by T.

In the case where impact input from the outside is large in a certain kind of a vehicle as described above, when the stop projections 325a' and 325b' move in the axial direction beyond the elastic deformation of the support projections 325a and 325b, the stop projections 325a' and 325b' are supported by the outer race 307b of the bearing 307, so that impact noise and the deformation or breakage of a component, which may be caused by excessive axial movement, can be prevented.

As described above, the support member 320 is formed to include the main body 323 and the support projections 325a and 325b. The shapes of the support projections 325a and 325b may be partially different depending on the method of forming the support projections 325a and 325b.

That is, in one case, it is possible to cut both sides of the support projections 325a and 325b in the annular plate member 323 and to bend the support projections 325a and 325b such that a remainder 322 of the main body is left between each two adjacent support projections 325a and 325b as illustrated in FIG. 8. In another case, it is also possible to cut the remainder 322 of the main body as illustrated in FIG. 4. Both cases are equally applicable to the present invention.

The support member 320 is formed of an elastic material, such as a metal. In some cases, the support member 320 may be formed of an engineering plastic series material, such as polyoxymethylene (POM), polyamide (PA), polycarbonate (PC), polyimide (PI), or polybutylene terephthalate (PBT).

As described above, according to the present invention, when a rack bar slides while a ball nut is rotated, a bearing can be prevented from being rotated or released by axial and radial vibration, which is generated through the rack bar, the ball nut, a rack housing, and the like, and vibration and noise transmitted through the ball nut and the rack bar can be reduced, so that a comfortable steering feeling can be provided to the driver.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack assist type electric power steering apparatus comprising:
   a ball nut coupled to a rack bar via balls to be rotated, and configured to cause the rack bar to slide;
   a bearing mounted on an outer peripheral surface of the ball nut so as to support rotation of the ball nut; and
   a support member coupled to at least one of a space between one side of an outer race of the bearing and a housing and a space between the other side of the outer race of the bearing and the housing so as to support the bearing, the support member comprising:
   a main body formed in an annular shape;
   first support projections protruding outward from the main body and having a shape bent with respect to the main body in a first direction; and
   second support projections protruding outward from the main body and having a shape bent with respect to the main body in a second direction opposite to the first direction.

2. The power steering apparatus of claim 1, wherein the first and second support projections are formed in a circumferential direction of the main body to be spaced apart from each other.

3. The power steering apparatus of claim 1, wherein the first and second support projections having opposite bent directions in the main body are alternately arranged in the circumferential direction.

4. The power steering apparatus of claim 1, wherein the first and second support projections are formed such that a length from a bent portion in the main body to an end of each of the support projections is 1.3 to 1.7 times longer than a length from an inner end of the main body to the bent portion.

5. The power steering apparatus of claim 1, wherein the first and second support projections are bent such that an angle between the first and second support projections and a radial direction of the main body becomes in a range of 30 degrees to 50 degrees.

6. The power steering apparatus of claim 1, wherein one or more of the first and second support projections are formed to have a sharp end edge so that the end edge is elastically deformed while being supported by the housing.

7. The power steering apparatus of claim 1, wherein one or more of the first and second support projections are formed to have a round end edge so that the end edge is elastically deformed while being supported by the housing.

8. The power steering apparatus of claim 1, wherein the support member includes a stop projections between support projections which are bent in a same direction, the stop projection being formed by bending to have a length that is smaller than a length of the support projections.

9. A rack assist type electric power steering apparatus comprising:
   a ball nut coupled to a rack bar via balls to be rotated, and configured to cause the rack bar to slide;
   a bearing mounted on an outer peripheral surface of the ball nut so as to support rotation of the ball nut; and
   a support member coupled to at least one of a space between one side of an outer race of the bearing and a housing and a space between the other side of the outer race of the bearing and the housing so as to support the bearing, the support member comprising a main body formed in an annular shape and support projections protruding from the main body,
   wherein the support projections are formed such that a length from a bent portion in the main body to an end of each of the support projections is 1.3 to 1.7 times longer than a length from an inner end of the main body to the bent portion.

10. The power steering apparatus of claim 9, wherein the support projections are formed in a circumferential direction of the main body to be spaced apart from each other.

11. The power steering apparatus of claim 9, wherein at least one of the support projections is formed to have a bent direction from the main body, which is opposite to a bent direction of one or more of other remaining support projections.

12. The power steering apparatus of claim 9, wherein the support projections having opposite bent directions in the main body are alternately arranged in the circumferential direction.

13. The power steering apparatus of claim 9, wherein one or more of the support projections are formed to have a sharp end edge so that the end edge is elastically deformed while being supported by the housing.

14. The power steering apparatus of claim 9, wherein one or more of the support projections are formed to have a round end edge so that the end edge is elastically deformed while being supported by the housing.

15. A rack assist type electric power steering apparatus comprising:
a ball nut coupled to a rack bar via balls to be rotated, and configured to cause the rack bar to slide;
a bearing mounted on an outer peripheral surface of the ball nut so as to support rotation of the ball nut; and
a support member coupled to at least one of a space between one side of an outer race of the bearing and a housing and a space between the other side of the outer race of the bearing and the housing so as to support the bearing, the support member comprising a main body formed in an annular shape and support projections protruding from the main body,
wherein the support projections are bent such that an angle between the support projections and a radial direction of the main body becomes in a range of 30 degrees to 50 degrees.

16. The power steering apparatus of claim 15, wherein the support projections are formed in a circumferential direction of the main body to be spaced apart from each other.

17. The power steering apparatus of claim 15, wherein at least one of the support projections is formed to have a bent direction from the main body, which is opposite to a bent direction of one or more of other remaining support projections.

18. The power steering apparatus of claim 15, wherein the support projections having opposite bent directions in the main body are alternately arranged in the circumferential direction.

19. The power steering apparatus of claim 15, wherein one or more of the support projections are formed to have a sharp end edge so that the end edge is elastically deformed while being supported by the housing.

20. The power steering apparatus of claim 15, wherein one or more of the support projections are formed to have a round end edge so that the end edge is elastically deformed while being supported by the housing.

* * * * *